Oct. 9, 1962 F. E. HOLLADAY 3,056,980
PLASTIC SHEETING ARTICLES AND MANUFACTURE
Filed April 23, 1958
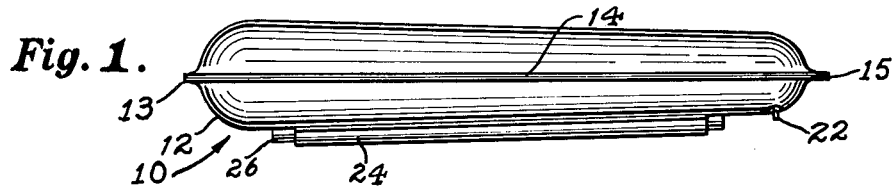
Fig. 1.
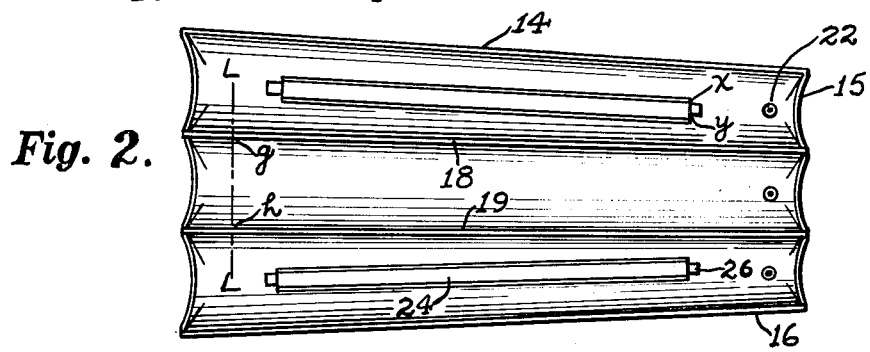
Fig. 2.
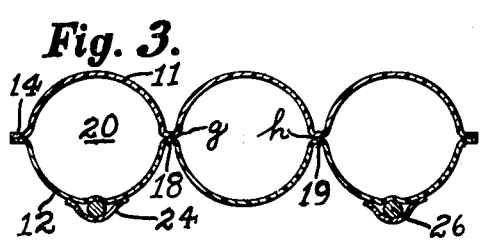
Fig. 3.
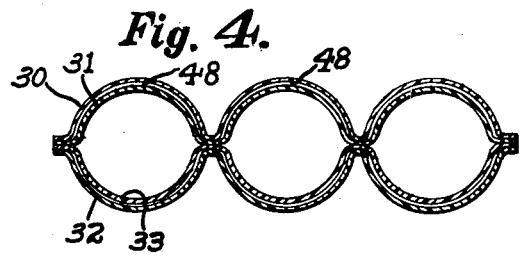
Fig. 4.
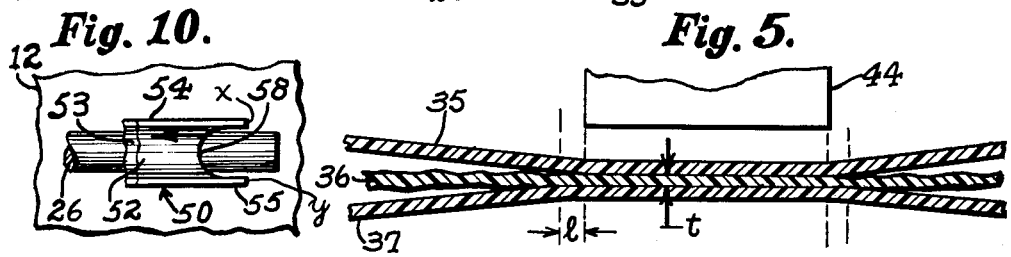
Fig. 10. Fig. 5.
Fig. 7. Fig. 8. Fig. 6.
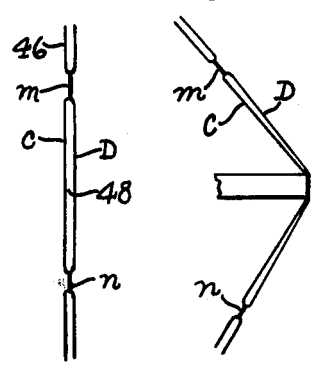
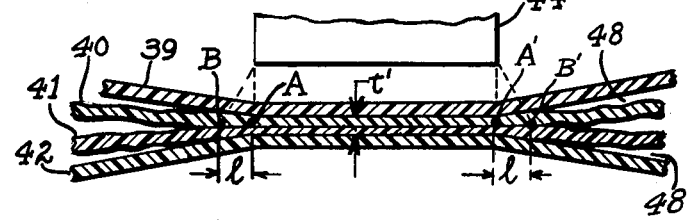
Fig. 9.
INVENTOR.
FORREST E. HOLLADAY.
BY
J. P. Santo
ATTORNEY.

3,056,980
Patented Oct. 9, 1962

3,056,980
PLASTIC SHEETING ARTICLES AND MANUFACTURE
Forrest E. Holladay, Ann Arbor, Mich.
(14314 Shadywood Drive, Plymouth, Mich.)
Filed Apr. 23, 1958, Ser. No. 730,429
14 Claims. (Cl. 9—310)

This invention relates to improvements in the manufacture of plastic sheeting, and to plastic sheeting articles including inflatables such as air mattresses, floats, and the like, having fusably seamed edges and/or narrow surface portions along which adjacent portions of one or more sheets of material are joined together.

For reasons of weight and economy, such articles are manufactured from heat weldable or vulcanizable plastic sheeting material such as polyvinyl chloride, and, as is well known, are highly susceptible to injury and breakage. Light sheets of such material, 0.006 to 0.012 inch thick, lack sufficient strength to stand up under even moderate conditions of use, while so called heavy duty materials, 0.020 inch and thicker, are lacking in pliability, and, under conditions of twisting or wrinkling, easily break through semi-rigid points of the plastic material, such as at seams and weld ends, where adjoining surfaces of the sheeting article are attached together. Thick sheets of such material also tend to become brittle and frangible when subjected to temperatures below 65° F., such as encountered in cold bodies of water, for example.

While the flexibility of the sheeting may be increased by the addition of a small amount of plasticizer to the constituents of the plasticized material when originally mixed, in order to increase the softness of the finished material, this expedient weakens the material so that when the article is subjected to moderate increases of temperature, the sheeting will expand unduly, rendering it undesirable for use in beachware and other plastic sheeting articles subjected to moderate heat or sunlight conditions.

Another serious problem encountered in the use of such sheeting material is that of sheet porosity caused by air bubbles in the plasticized material of which the sheets are originally formed by rolling and calendering processes. While porosity is claimed to be reduced by continuous lamination or overlaying processes in which two sheets of thin material are adhesively chemically or thermally bonded continuously over their entire surfaces to form a homogeneous sheet of double thickness, it has been found that an air bubble in either half of the resulting continuously bonded sheet is still a weak spot, and, under conditions of abuse, starts a break that will progress through the adjoining constituent sheet, because of the common intersurface thereof.

Accordingly, the present invention has for its general object to provide an improved plastic sheeting construction for plastic sheeting articles subjected to adverse use and a moderately broad range of temperature variation conditions.

A specific object is to provide an improved construction for plastic sheeting articles which provides the flexibility and pliability of thin sheets of material coupled with the strength, durability and the wear and abrasion resisting properties of thick sheeting material.

Another object is to provide a plastic sheeting construction in which the hazard of progressive fractures, punctures, or breaks, resulting from sheet porosity and other causes, is materially reduced.

Another object is to provide an improved construction for seam welded plastic sheeting articles, which are subjected to inflation and/or other thrusts or loads tending to pull the sheeting apart at the welded seams thereof, to resist rupturing and tearing of the article sheeting at the seams and fused edges thereof.

Another object is to provide an improved construction for plastic sheeting articles having the increased seam strength and aforementioned improved physical properties, without increasing the aggregate thickness of the sheeting dictated by the surface strength and use requirements of the article.

Another object is to provide an improved inflatable float construction having plural walled cells formed of a plurality of disassociated plastic sheets sealed or fused together along their peripheral edges and spaced points along the expanse thereof, between which points the sheets forming a side of the float maintain their separate independent surfaces to prevent a tear or puncture occurring in one of the sheets from progressing into the adjacent sheet, and the adjacent sheets forming a side of the float support each other with respect to a pull or thrust displacing the sheets in the same direction.

Another object is to apply the seam strength increasing and tear resisting principles of the invention to an inflatable float or surfer construction of the type having longitudinally extending reinforcing rods or poles on the underside of the inflatable article serving as handles and/or guides therefor.

The manner in which the above and related objects is accomplished together with the attending advantages and features of the invention will appear more fully from the following detailed description and drawings, wherein:

FIG. 1 is a side elevation view of a plastic sheeting inflatable float article;

FIG. 2 is a bottom plan view of the article of FIG. 1;

FIG. 3 is an enlarged transverse sectional view of FIG. 2;

FIG. 4 is a transverse sectional view of a plural wall float construction in accordance with the present invention;

FIGS. 5 and 6 are transverse sectional views of plastic sheeting material constructions in accordance with the present invention;

FIGS. 7 and 8 are single line diagrammatic views of a section of double walled sheeting material shown in a flattened and displaced condition for purposes of explaining some of the factors contributing to the increased seam strength and improved properties of the plastic sheeting material constructions of the present invention;

FIG. 9 illustrates the application of the principles of the invention to a pole loop structure for the article of FIG. 1; and FIG. 10 illustrates a further constructional improvement for increasing the seam strength properties of the pole loop structure of FIG. 9.

Referring to the drawings, FIGS. 1, 2 and 3 illustrate a form of surfer or float 10 formed of a top sheet 11 and a bottom sheet 12 of synthetic plastic material, such as polyvinyl chloride. The sheets are sealed together around their peripheral edges 13, 14, 15 and 16, and along spaced, narrow seam portions 18, 19 to form between the sheets a plurality of longitudinally extending inflatable cells or compartments as 20 into which pressured air is admitted through one or more air valves shown at 22. Secured to the bottom sheet 12 by longitudinally extending narrow sections or strips of material 24, is a transversely spaced pair of rigid poles or rods 26, which, in addition to increasing the longitudinal rigidity of the structure, serve as handles or gripping means to assist holding the float to the body of the user lying prone thereon. The poles also may be used for attachment of anchor or load binding ropes, a solid bottom or other appurtenances not otherwise supportable from fragile plastic structures of this character.

This type of structure exhibits a frequently recurring failure at points such as g and h, where the oppositely displaced sheets are joined by the welded seams and edges. End thrust applied in the direction of the arrows in FIG. 2, to the edge of 13 of the structure against the seams 18, 19, causes wrinkling of the seam material, which together with the internal inflation thrust acting against the seams, sets up a tearing action in the vicinity of the intersection of the seams with a line L—L displaced a few inches back of the edge 13. Destructive abuse tests in which a mechanical thrust was repeatedly applied at the edge 13 of a structure formed of 0.012 inch gauge material, caused the structure to break out at the points g and h of FIG. 3, on an average of 319 strokes to failure.

Contrary to expectation, little or no improvement in the resistance to this type of tear was obtained by the use of heavier gauge sheeting material, 0.020 inch in thickness, in this article.

However, by replacing each of the heavy gauge top and bottom sides or sheets of the float article with two or more separate or disassociated layers or plies 30, 31 and 32, 33 of light gauge material as in the double walled float structure of FIG. 4, I have obtained a remarkable increase in the seam strength, tear, puncture and abrasion resistance properties of the resulting article. Under the same aforementioned mechanical abuse tests, double walled float structures in which the top and bottom sides or surfaces of the article were each formed of two thin disassociated sheets of 0.012 gauge material exhibited an average of 15,000 strokes to failure, as against 319 strokes for the single walled structure. The use of a low temperature sheet of compatible plastic material for the outermost sheets 30 and 32, extended the fatigue failure point of the double walled structure to 32,000 and 43,000 strokes without breaking.

In accordance with my invention, I divide the sheet thickness dictated by the strength and use requirements of the article into two or more thin impervious sheets of similar or compatible heat weldable material and form the respective sides or parts of an article such as that illustrated in FIG. 4, of several disassociated sheets of material by placing the several sheets or material sections for each side of the article in flat, backing intimate surface contacting relation with each other and bond or seal the several sheets or sections forming a side of the article to each other and to the several sheets or sections forming the other side of the article at periodically spaced points or attachment seams by flat welding all of the sheets over spaced narrow seam portions along their common expanse until the innermost sheets are extruded slightly from the attachment seams. The duration of the heat sealing or welding step may vary depending somewhat upon the power cycle of the welding apparatus and other factors including the thickness and composition of the material. Since the heat welding process causes the aggregate of the material to heat outwardly from the inside or center where three or more disassociated plies of material are flat welded together as in FIGS. 5 and 6, the innermost sheet 36 of the three sheeted article weld and the innermost sheets 40 and 41 of the four sheeted article weld will reach fusing temperature before the outermost sheets 35, 37 and 39, 42 respectively. The innermost sheet or sheets, therefore, will extrude more than the outermost sheets, resulting in an actual lengthening or slackening of the interior sheet or sheets which serves to remove inflation and other stresses therefrom, as will appear more fully below.

The extrusion or slackening of the innermost sheet or sheets caused by the application of heat through the weld bar 44 brought into contact with the several 0.012 gauge sheets for a period of from 1 to 2 seconds, is illustrated by the extension l in FIGS. 5 and 6 on opposite sides of the weld in which the material shown at B was previously at A before the weld, and was extruded from the innermost sheets. After the weld, the outermost sheets in both cases illustrated remained substantially the same as their original thickness, while a 33% reduction in the total thickness t of the innermost sheet or sheets was noted.

The various factors contributing to the superior strength of plastic sheeting articles formed of periodically bonded, multiple sheeting material are described below. With reference to FIG. 7, for example, there is illustrated in single line diagrammatic form a section of double walled material 46 comprised of two separate disassociated sheets C, D of plastic material welded at periodically spaced points m, n along their common expanse. In the flattened condition of the sheeting material, the distances m—C—n and m—D—n bridged by the separate constituent sheets may be considered to be equal. But, when the two sheets are subjected to an inflation or side thrust displacing the sheets in the same direction and away from the plane of their registration or attachment points m, n, as indicated in FIG. 8, the distance m—C—n is less than the distance m—D—n by reason of the finite thickness of the sheets, so that sheet D will be more tightly stretched and will be under greater tension and strain than sheet C. Since in the four sheeted structure of FIG. 4, the inner sheet 31 forming one of the sides of the inflatable article is of slightly greater length than its adjacent outer sheet 30 by reason of the slightly greater extrusion thereof, the inner sheet 31 will be slacker and will actually be even less tightly stretched than the outer sheet, and the inflation stresses will be even more further removed therefrom.

It is apparent that in the single walled construction of FIG. 3, the force of inflation must be absorbed completely by the single top and bottom sheets. Since in the reinforced or double walled construction, the outer sheet 30 is under greater tension, and is separable or disassociated from the inner sheet except at the heat welded seam portions, it supports the inner sheet 31 against the applied inflation thrust and takes a greater share of the load, so that the tension on the inner sheet 31 is reduced below the tear point of the material. This factor, plus the fact that a greater flexibility of sheeting material is obtained with two or more light gauge sheets than with a single heavy gauge sheet of the same thickness, removes the principal cause of seam breakage in the aforementioned structures without necessitating the use of any greater amount of material than that required for such structures previously formed of heavy duty sheeting material.

That the outer sheet 30 takes the greater share of the inflation thrust or load applied to the inner sheet 31, may be demonstrated by considering the force distribution and reactions in an inflatable body or structure formed of the double walled sheeting material described herein. As the article is inflated, the internal pressure displaces the inner walls of the inflatable cell or compartment which begins to conform to, and to assume the inflated shape of the article. Since the outer sheet 30 is of no greater expanse, and is actually of lesser expanse, than the inner sheet 31, and is attached thereto or in registration therewith only at the spaced points or boundary seams, the outer sheet, by reason of its finite thickness and deflection from its original flattened condition and its lesser amount of extrusion from the welding process, begins to expand first, while the slack inner sheet 31 may still be unstressed. Thus, the internal inflation thrust at some point during the inflation of the article is supported entirely by the outer sheet. In the fully inflated condition of the article, both sheets 30 and 31 will have expanded and the force of inflation will be supported by both of the sheets, with the outer sheet providing a somewhat greater proportion of the reaction force by reason of its greater expansion.

The fact that in the stressed condition of the multiple sheeting material, one of the component sheets is stretched more tightly and is in greater tension than the other component sheet, contributes in a related aspect to the increased strength and durability of the resulting double walled sheeting material in that the less tightly stretched sheet, sheet C in FIG. 8 or 31 in FIG. 4, is more difficult to puncture and tear. Since the inner sheet is looser and less taut than the outer sheet, it will offer greater resistance to a sharp, piercing, or cutting object or point concentrated force or impact applied to the outer sheet. This factor, plus the intersurface discontinuity 48 presented between the unbonded intersurfaces of adjacent sheets between the bonding points or seams, prevents a tear starting in the outer sheet from progressing into the inner sheet, thus rendering the multiple sheeting material especially desirable for use in inflatable structures. At the same time, the cushioning effect of the softer or less tightly stretched inner sheet, against which the inflation thrust is directly applied, makes the outer sheet, itself, more difficult to puncture.

In a related connection, FIG. 9 illustrates the application of the principles of the invention to a supporting construction or pole loop 50 for the rigid poles or rods 26 provided on the underside of the float article of FIG. 1. In prior constructions, the pole loop 24 of FIG. 1 was composed of a single sheet of material, which would tear out usually at the end of the weld seams x, y where the pendent loop material was attached to the underside of the float and was highly susceptable to breakage along its surface, any kind of an irregular break therein resulting in continued tearing thereof beyond possible use almost immediately.

In the improved construction of FIG. 9, the pole loop 50 is formed of a pair of separable disassociated sheets 52 and 53 which are fusibly welded to the sheet 12 along seams 54 and 55. With the double layered loop construction, even where both of the sheets were pierced through exposing the surface of the pole, or with the pole tip actually protruding through a hole in both sheets, the material did not tear at the hole. The sheets will still support each other against opening of the tear because the intersurface discontinuity 48 between the two sheets 52, 53 will cause the separate sheets to tear in different directions, which allows the intersupport and surface strength of the two sheets to be effective even though both sheets are cut through.

The seam strength of the double stranded or layered pole loop may be further increased, particularly at the ends of the seam attachment points x, y to withstand a pull or thrust on either or both of the sheets 52, 53 away from the sheeting surface 12 forming the underside of the float, by providing a strain relieving cut-back 58, preferably in both of sheets 52 and 53, of the pole loop, as indicated in FIG. 10. This expedient effectively lengthens the end of the pole loop material and distributes or directs the major portion of the applied stress in a direction along the attachment seams instead of concentrating it at the points x, y as it otherwise would be if the cut-back were not provided and the end of the pole loop material were extended straight across between the attachment points as in the prior construction of FIG. 2.

The terms "opposed sheets" or "oppositely displaceable sheets" as used herein are intended to denote the relationship of sheets as 40 and 41 in FIG. 6, for example, in which each of these sheets is backed by a different one of the sheets 39 and 42 referred to herein as "backing sheets," all of which sheets are "disassociated" from each other in the sense that they preserve their separate surface identities relative to each other to act as separate, loose individual sheets disconnected from each other except at their periodically spaced attachment points or seams where the several sheets are attached to each other.

What is claimed is:

1. In a plastic sheeting article having a first section of heat weldable plastic sheeting material of broad surface expanse and a second section of similar sheeting material which is of lesser surface expanse than said first section and is to be attached thereto along spaced narrow seam portions common to both of said sheeting sections and in which the sheeting sections are subjected to a thrust or load displacing them in opposite directions and tending to tear the second sheeting section from the first sheeting section at the attachment seams of the finished article, the method of constructing the article to decrease the tearing tendency and to increase the seam strength of the sheeting sections forming the finished article which comprises the steps of backing the second sheeting section with a third sheeting section of similar and compatible heat weldable material of finite thickness disassociated from but in intimate surface contacting relation therewith and retaining the adjacent surfaces of each of said sheeting sections disassociated from each other except at said attachment portions by heat welding said second sheeting section to said third sheeting section and to said first sheeting section only at and along said attachment seams by heating the aggregate of the three sheeting sections outwardly from the second sheeting section and raising the second sheeting section to fusing temperature prior to the first and third sheeting sections, whereby in the finished article the third sheeting section will be placed under greater tension than the second sheeting section under the application of thrust to the second sheeting section in a direction displacing both the second and third sheeting sections from the first sheeting section and will support the second sheeting section against the applied thrust.

2. The method of increasing the strength and the tear, puncture and abrasion resistance properties of a plastic sheeting article which comprises forming the article of at least three disassociated sheets of thermoplastic material by backing each surface of one sheet of heat weldable material with a separate sheet of similar compatible material disassociated from but in intimate surface contacting relation therewith and retaining the adjacent surfaces of each of said sheets disassociated from each other except at a plurality of spaced narrow seam portions by heat welding all of said disassociated sheets together only at and along said spaced narrow seam portions over their common expanse by raising the inner one of said sheets to fusing temperature prior to the outer backing sheet on each surface thereof and until a part of the material of the innermost sheet is extruded at the seam portions thereof to lengthen the innermost sheet slightly beyond the length of the outermost sheets between adjacent seam portions.

3. An article of plastic sheeting including a sheet of thermoplastic material backed on each of the opposite surfaces thereof by a compatible sheet of similar thermoplasic material disassociated therefrom but in intimate surface contacting relation therewith and heat sealed thereto only at and along spaced narrow seam portions common to said sheets where the first mentioned sheet of material has been heated to and attained fusing temperature prior to the backing sheet on either surface thereof, said first mentioned sheet of material maintaining its separate surface identities relative to the backing sheet on each of the opposite surfaces thereof to provide an intersurface discontinuity therebetween along the expanse of the sheets between adjacent spaced seams and being of slightly greater extruded length between adjacent seams than the backing sheet on either surface thereof.

4. A plastic sheeting article including a pair of oppositely displaceable sheets of thermoplastic material each having a separate backing sheet of similar thermoplastic material disassociated from but in intimate surface contacting relation therewith and fusibly heat sealed thereto only at and along spaced narrow seam portions common to all of said sheets where the oppositely displaceable sheets of material have been heated to and attained fusing temperature prior to each backing sheet, each of said oppositely displaceable sheets maintaining its separate surface identities relative to the backing sheet adjacent thereto to provide an inter-surface discontinuity therebetween along the expanse of the sheets between adjacent spaced seams and being of slightly greater extruded length between adjacent seams than the backing sheet located outwardly thereof.

5. A pneumatic float comprising a longitudinally extending inflatable body having top and bottom sides and formed of at least two sheets of heat weldable air impervious plastic material sealed along their peripheral edges and along transversely spaced, narrow seam portions extending longitudinally of the float, a transversely spaced pair of longitudinally extending strips of loops of material extending longitudinally of and attached to the bottom side of the float, and a pair of reinforcing poles serving also as handles each inserted in a different one of said loops between the loop material and the bottom side of the float, each of said loops including a disassociated superimposed pair of strips of material in separable but intimate surface contacting relation and bonded to each other and to the bottom side of the float only at and along the longitudinally extending peripheral edges of the strips.

6. An inflatable float in accordance with claim 5 above wherein the ends of each of the strips of material forming each of the pole loops are cut back to relieve any strain from the ends of the seams where the strips of material are attached to the bottom side of the float.

7. A pneumatic float comprising a longitudinally extending inflatable body having top and bottom sides each formed of at least two disassociated sheets of heat weldable air impervious, plastic material heat sealed to each other and to the sheets forming the other side of the float only at and along the peripheral edges and transversely spaced narrow seam portions extending longitudinally of the float, a transversely spaced pair of loops of material extending longitudinally of and attached to the bottom side of the float, and a pair of reinforcing poles serving also as handles each inserted in a different one of said pole loops between the loop and the bottom side of the float, each of said loops comprising at least one strip of longitudinally extending plastic sheet material weldably seamed to the bottom side of the float along the longitudinally extending peripheral edges of the pole loop material and having a strain relieving cut-back formation to relieve any strain from the ends of the seams where the loop material is attached to the bottom side of the float.

8. In a pneumatic float article comprising a longitudinally extending inflatable body having top and bottom sides of air impervious, heat weldable plastic sheeting material, a pair of transversely spaced pole loops attached to the bottom side of the float body, and a pair of reinforcing poles serving also as handles each received in a different one of said loops, the improvement wherein each of said pole loops comprises a first strip of heat weldable plastic sheeting material backed by a similar but disassociated strip of heat weldable plastic sheeting material in separable but intimate surface contacting relation therewith and heat sealed thereto and to the bottom side of said float body only at and along a transversely spaced pair of heat welded seams at the longitudinally extending edges of the strips between which seams the first strip of plastic material immediately adjacent the bottom side of the float body has a slightly greater extruded length than and is in a slackened condition relative to the strip of material in back thereof.

9. An article of the character described in claim 8 above wherein the ends of each of the strips forming a pole loop include a strain relieving cut-back therein directed inwardly of and in the direction of the longitudinal extent of the strips to remove stresses from the ends of the weld points where the strips are attached to the bottom side of the float body.

10. A pneumatic float comprising a longitudinally extending inflatable body having plural walled top and bottom sides each formed of an inner sheet and a superimposed outer sheet of air impervious, heat weldable plastic material in separable but intimate surface contacting relation and heat sealed to each other from the inner sheet and to a similar inner sheet and outer sheet forming the other side of the float body only at and along heat welded narrow seam portions spaced transversely and longitudinally of the float body and along the common expanse of the sheets at which seam portions the inner sheets have been heated to fusing temperature prior to the outer sheets and between which seam portions the outer and inner sheets forming a respective side of the float body maintain their separate surface identities and present an intersurface discontinuity between their contacting surfaces and each of the two innermost sheets on the opposite sides of the float has a slightly greater extruded length than and is in a slackened condition relative to its respective outer sheet.

11. A multiple-compartmented float comprising a longitudinally extending inflatable body having plural walled top and bottom sides each formed of an inner sheet and a superimposed outer sheet of an impervious, heat weldable material in separable but intimate surface contacting relation and heat sealed to each other from the inner sheet and to a similar inner sheet and outer sheet forming the other side of the float body only at and along the peripheral edges and at least two transversely spaced, longitudinally extending, heat welded, seam portions located inwardly of the longitudinal peripheral edges of the float body to provide a plurality of longitudinally extending inflatable compartments integrally united and spaced transversely of the float body, the inner and outer sheets forming a respective side of the float maintaining their separate identities and being disassociated from each other except at said heat welded seam portions where the inner sheets have been heated to fusing temperature prior to the outer sheets and between which seam portions each of the two innermost sheets on the opposite sides of the float is of a slightly greater extruded length than and is in a slackened condition relative to its respective outer sheet.

12. In a plastic sheeting article including a pair of opposed sheets of thermoplastic, heat weldable material which are to be attached together along spaced narrow seam portions and in which the sheets are subjected to a thrust or load displacing them in opposite directions and tending to tear the sheets at the attachment seams, the method of constructing the article to prevent tearing of the sheets at the seams which comprises the steps of backing each of said opposed sheets with a separate backing sheet of similar, heat weldable material disassociated from but in intimate surface contacting relation therewith and retaining the adjacent surfaces of each of said sheets disassociated from each other except at said spaced narrow seam portions by heat welding all of said sheets together along said attachment seams by heating the opposed sheets to fusing temperature prior to the backing sheets until a part of the material of each of the opposed sheets is extruded at the attachment seams to lengthen the opposed sheets slightly beyond the length of the backing sheets between the attachment seams.

13. A pneumatic surf float comprising a longitudinally extending inflatable body having plural walled top and bottom sides each formed of at least two disassociated sheets of air impervious plastic material in separable but intimate surface contacting relation and heat sealed to each other and to two similarly disassociated sheets forming the other side of said body only at and along transversely and longitudinally spaced narrow, heat welded seam portions along their common expanse between which seam portions the two disassociated sheets forming a side of the float body maintain their separate surface identities and present an intersurface discontinuity therebetween, a transversely spaced pair of longitudinally extending strips of material forming loops extending along the length of and attached to the bottom side of the float body, and a pair of longitudinal reinforcing poles serving also as handles each inserted in a different one of said loops in contact with and between the loops and the bottom side of the float body, the ends of the material strips forming the said pole loops including a strain relieving cut-back therein directed inwardly and in the direction of the longitudinal extent of the material strips to remove stresses from the ends of the points where the strips are attached to the bottom side of the float.

14. A pneumatic surf float comprising a longitudinally extending inflatable body having plural walled top and bottom sides each formed of at least two disassociated sheets of air impervious plastic material in separable but intimate surface contacting relation and heat sealed to each other and to two similarly disassociated sheets forming the other side of said body only at and along transversely and longitudinally spaced narrow, heat welded seam portions along their common expanse between which seam portions the two disassociated sheets forming a side of the float body maintain their separate surface identities and present an intersurface discontinuity therebetween, a transversely spaced pair of longitudinally extending strips of material forming loops extending along the length of and attached to the bottom side of the float body, and a pair of longitudinal reinforcing poles serving also as handles each inserted in a different one of said loops in contact with and between the loop and the bottom side of the float body, each of said pole loops comprising a disassociated pair of strips of material in separable but intimate surface contacting relation and attached to the bottom side of the float.

References Cited in the file of this patent

UNITED STATES PATENTS

| | | |
|---|---|---|
| 1,217,253 | Williamson | Feb. 27, 1917 |
| 1,713,733 | Anderson | May 21, 1929 |
| 1,920,961 | Anderson | Aug. 8, 1933 |
| 1,981,871 | Manson | Nov. 27, 1934 |
| 2,097,862 | McKay | Nov. 2, 1937 |
| 2,199,047 | Fisher | Apr. 30, 1940 |
| 2,202,415 | Christopher | May 28, 1940 |
| 2,327,794 | Hurt | Aug. 24, 1943 |
| 2,367,725 | Lindh et al. | Jan. 23, 1945 |
| 2,689,812 | Mollica | Sept. 21, 1954 |
| 2,712,139 | Kelly | July 5, 1955 |
| 2,717,399 | Backhouse | Sept. 13, 1955 |
| 2,751,611 | Mann | June 26, 1956 |
| 2,816,299 | Holladay | Dec. 17, 1957 |